W. E. COFFIN.
COUPLING SHANK AND YOKE CONNECTION.
APPLICATION FILED MAR. 31, 1915.
1,157,084.
Patented Oct. 19, 1915.
2 SHEETS—SHEET 1.
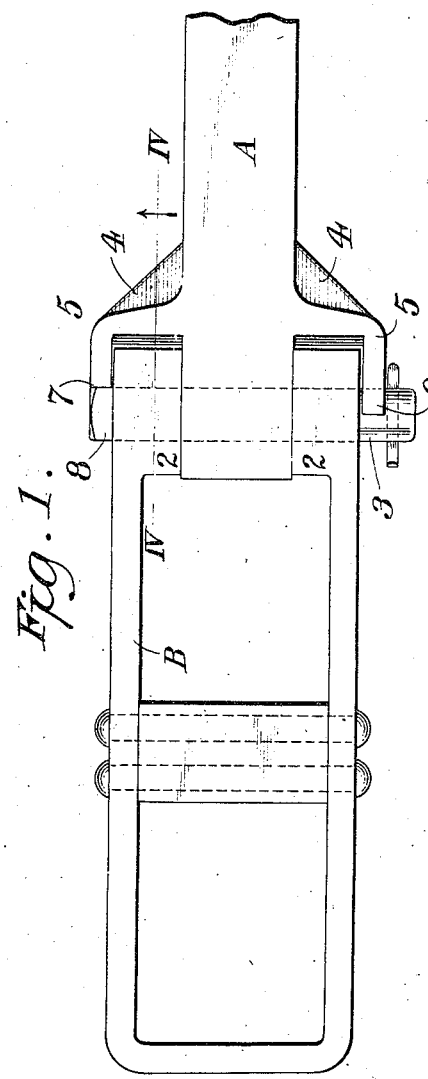
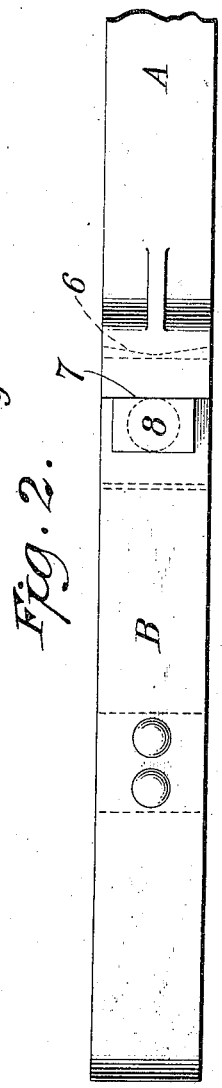
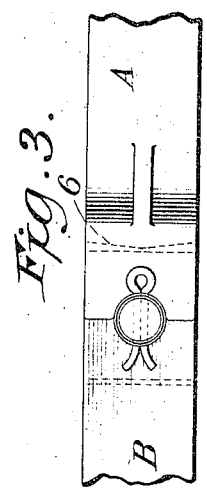
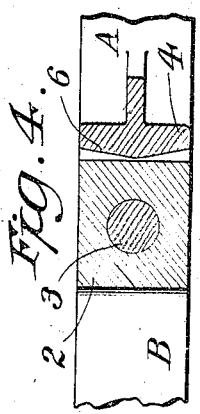
Witnesses:
Raphaël Fetter
Inventor
Walter E. Coffin
By his Attorney
Clarence A. Kent W. E. COFFIN.
COUPLING SHANK AND YOKE CONNECTION.
APPLICATION FILED MAR. 31, 1915.
1,157,084.
Patented Oct. 19, 1915.
2 SHEETS—SHEET 2.
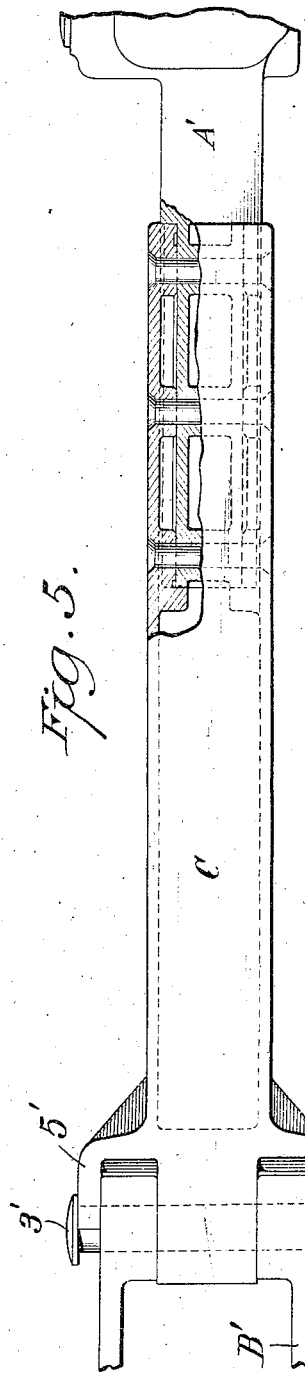
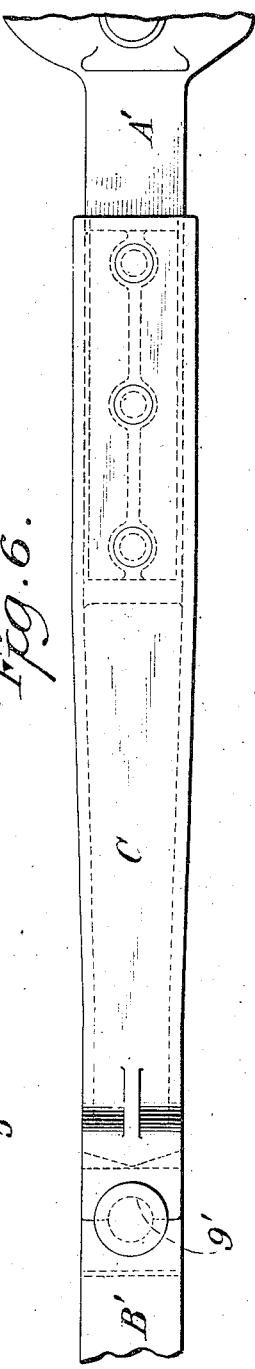
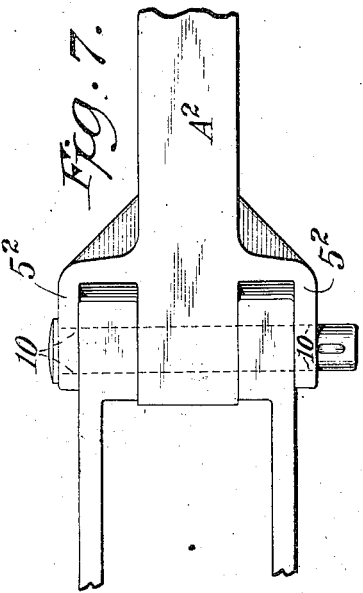
Witnesses:
Raphaël Netter
Inventor
Walter E. Coffin
By his Attorney
Clarence A. Kent

UNITED STATES PATENT OFFICE.

WALTER E. COFFIN, OF CLEVELAND, OHIO, ASSIGNOR TO THE NATIONAL MALLEABLE CASTINGS COMPANY, OF CLEVELAND, OHIO, A CORPORATION OF OHIO.

COUPLING SHANK AND YOKE CONNECTION.

1,157,084.

Specification of Letters Patent.

Patented Oct. 19, 1915.

Application filed March 31, 1915. Serial No. 18,230.

*To all whom it may concern:*

Be it known that I, WALTER E. COFFIN, a citizen of the United States, and a resident of Cleveland, Cuyahoga county, Ohio, have invented new and useful Improvements in Coupling Shank and Yoke Connections, of which the following is a specification, reference being had to the accompanying drawings, in which—

Figure 1 is a side elevation of my improved device; Fig. 2 is a plan thereof; Fig. 3 is a bottom view thereof and Fig. 4 is a section on lines IV—IV of Fig. 1; Fig. 5 is an elevation of a modified form of my device; Fig. 6 is a plan thereof, and Fig. 7 is an elevation of a further modification of my device.

My invention relates to coupler shank and yoke connections, and is designed to provide a simple and convenient form of connection in which the parts can be readily disconnected, either by straight rearward movement of the yoke or by forward movement of the coupler shank, and permits the coupler to angle laterally relative to the yoke. It also makes provision for an additional buffing bearing on the pivot pin.

Referring to the drawings, A designates the coupler shank and B the yoke, which is of the usual U-shape, open at its forward end. The forward ends of the arms of the yoke are in the form of enlarged bosses 2, which are of greater vertical depth than the thickness of the arms of the yoke, so as to provide a substantial bearing for the body of the connecting pin or bolt 3. As shown, the bosses 2 may terminate at their forward ends substantially at right angles to the line of draft. The coupler shank at its rearward end has projections 4, which have rearwardly-extending lips 5 overlapping the bosses 2. The vertical faces 6 of the projections 4 are cut away or made divergent, to permit the coupler to angle laterally. Particularly where my invention is used with a tandem yoke, such as is shown in Figs. 1 and 2, it is desirable to provide additional buffing bearings at the upper and lower ends of the pin, by carrying the lips 5 rearwardly and providing bearings against the pin 3. As shown, one of the lips 5 has a square shoulder 7 coöperating with the head 8 of the pin, while the other lip 5 has a semi-circular recess 9 coöperating with the round portion of the pin, so that the pin will rotate with the coupler shank and not with the yoke. The overlapping of the projections 4 with the bosses of the yoke prevents the two arms of the yoke, which are not connected at their forward ends, from spreading and thereby throwing so great a bending moment upon the pin or bolt as to cause it to bend.

The parts can be readily assembled and the construction is a very convenient one in facilitating car repairs. After removing the pin or bolt 3 the yoke and coupler can be disengaged, either by a straight rearward movement of the yoke or by forward movement of the coupler shank. This enables the draft gear to be disengaged and drop down from the car frame, by simply sliding the coupler forward to an extent sufficient to disengage it from the yoke.

In Figs. 5 and 6 I have shown my invention applied to a sleeve connection in which the coupler A′ is shown riveted to a sleeve C, and the sleeve C is connected to the yoke B′ by a pin 3′. As shown, the lips 5′ have semi-circular recesses 9′, which engage the forward faces of the pins 3′.

In Fig. 7 I have shown the coupler shank $A^2$ having rearwardly-extending lips $5^2$ with apertures 10 therein, so that they completely encircle the pin, which not only provides an additional buffing bearing for the coupler shank, but also provides an additional pulling bearing on the pin, and the strains are thereby transmitted to it in quadruple shear.

The terms and expressions herein employed are used as terms of description and not of limitation, and I have no intention, in the use of such terms and expressions, of excluding any mechanical equivalent for the features shown and described, but recognize that various structural modifications are possible within the scope of the invention claimed.

What I claim is:

1. In a coupler shank and yoke connection, a draft rigging yoke having upper and lower arms, a vertical portion connecting said arms at their rear ends, the forward ends of said arms having integral enlarged bosses of greater vertical depth than the thickness of the arms, a pin hole in each of said bosses, a coupler shank seating between said bosses and having a pin hole registering with the holes in said bosses for reception of a pivot pin, the bosses having vertically-extending faces at their forward ends, projections on the top and bottom of the coupler shank, having vertically-extending and forwardly-flaring faces adapted to coöperate with the forward faces of the bosses to permit the coupler to angle laterally, said projections having rearwardly-extending lips adapted to overlie said bosses and having a buffing bearing against the ends of the pivot pin, the yoke and coupler shank being adapted to be disengaged after removal of the pin by a longitudinal movement of either of said members.

2. In a coupler shank and yoke connection, a draft rigging yoke of U-shape, having at its forward ends integral enlarged bosses, a coupler shank having an extension seated between said bosses, said bosses and extension being apertured for the reception of a pivot pin, projections on the top and bottom of the coupler shank having forwardly-flaring vertical faces adapted to coöperate with the forward faces of the bosses to permit the coupler to angle laterally, said projections also having rearwardly-extending lips adapted to overlie said bosses and having recesses therein for the ends of the pivot pin, the yoke and coupler shank being adapted to be disengaged by a longitudinal movement of either thereof after removal of the pivot pin.

WALTER E. COFFIN.